(12) United States Patent
Hughes

(10) Patent No.: US 7,484,301 B1
(45) Date of Patent: Feb. 3, 2009

(54) HACKSAW WITH A RECIPROCATING BLADE

(76) Inventor: Antonio Hughes, 6212 S. St. Lawrence, 2nd Floor, Chicago, IL (US) 60637

( * ) Notice: Subject to any disclaimer, the term of this patent is extended or adjusted under 35 U.S.C. 154(b) by 177 days.

(21) Appl. No.: 11/480,168

(22) Filed: Jul. 3, 2006

(51) Int. Cl.
B27B 21/02 (2006.01)
B27B 19/10 (2006.01)

(52) U.S. Cl. .......................... 30/506; 83/785
(58) Field of Classification Search .................. 30/392, 30/393, 506, 507, 509, 380, 394; 83/785, 83/784, 786; 474/5; 74/25
See application file for complete search history.

(56) References Cited

U.S. PATENT DOCUMENTS

| | | | | |
|---|---|---|---|---|
| 139,644 | A * | 6/1873 | Young | 83/750 |
| 199,845 | A * | 1/1878 | McChesney | 83/785 |
| 1,453,335 | A * | 5/1923 | Bennett | 30/380 |
| 1,467,720 | A * | 9/1923 | Field | 83/62.1 |
| 2,721,586 | A * | 10/1955 | Hill | 30/394 |
| 2,731,988 | A * | 1/1956 | Steiner | 83/784 |
| 2,777,408 | A * | 1/1957 | Beck | 112/470.21 |
| 3,524,597 | A * | 8/1970 | Burden, Jr. et al. | 241/142 |
| 3,807,241 | A * | 4/1974 | McKeen | 74/40 |
| 3,954,036 | A * | 5/1976 | Bech | 83/749 |
| 4,018,117 | A * | 4/1977 | Patterson | 83/16 |
| 4,949,464 | A | 8/1990 | Adomatis | |
| 5,018,420 | A * | 5/1991 | Plomb | 83/748 |
| D318,006 | S | 7/1991 | Wanner et al. | |
| 5,027,518 | A * | 7/1991 | Adomatis | 30/392 |
| 5,369,887 | A * | 12/1994 | Keevers | 30/394 |
| 5,388,334 | A * | 2/1995 | Halsey | 30/509 |
| 5,561,909 | A * | 10/1996 | Berg et al. | 30/392 |
| 5,870,829 | A | 2/1999 | Gugel et al. | |
| 5,924,209 | A | 7/1999 | Ward | |
| H1867 | H * | 10/2000 | Quiram | 83/781 |
| 6,393,957 | B1 * | 5/2002 | Wang | 83/602 |
| 6,550,365 | B1 * | 4/2003 | Zhang et al. | 83/785 |
| 2006/0154763 | A1 * | 7/2006 | Serkh | 474/59 |

FOREIGN PATENT DOCUMENTS

GB 2187135 A * 9/1987

* cited by examiner

Primary Examiner—Ghassem Alie
Assistant Examiner—Bharat C Patel
(74) Attorney, Agent, or Firm—Crossley Patent Law; Mark A. Crossley

(57) ABSTRACT

A hacksaw with a reciprocating blade for minimizing the amount of manual action needed to operate the hacksaw. The hacksaw with a reciprocating blade includes a U-shaped housing with a hacksaw blade. A motor assembly is positioned in the interior of the housing. A pair of cam members for converting rotational motion into linear motion are rotatably coupled to the housing. A pair of drive pulleys are coupled to the cam members with one being coupled to the motor assembly. A plurality of idler pulleys are positioned in the interior of the housing. A drive belt links the motor assembly and a second drive pulley. A power source powers the motor assembly. An actuator selectively provides power from the power source to the motor assembly. A holding mechanism for selectively holds the hacksaw blade stationary in conjunction with the motor assembly.

17 Claims, 3 Drawing Sheets

HACKSAW WITH A RECIPROCATING BLADE

BACKGROUND OF THE INVENTION

1. Field of the Invention

The present invention relates to saws and more particularly pertains to a new hacksaw with a reciprocating blade for minimizing the amount of manual action needed to operate the hacksaw.

2. Description of the Prior Art

The use of saws is known in the prior art. U.S. Pat. No. 5,561,909 describes an electrically operated reciprocating hacksaw. Another type of saw is U.S. Pat. No. 5,924,209 which is a powered coping saw.

While these devices fulfill their respective, particular objectives and requirements, the need remains for a device that is capable of being utilized in both a manual or powered mode and, while in the powered mode minimizes the amount of warp allowed by the blade.

SUMMARY OF THE INVENTION

The present invention meets the needs presented above by providing a locking mechanism that allows the user to hold the blade in a stationary position in conjunction of the natural holding forces induced by the motor assembly. Also, the blade is actuated from both ends through a drive belt and a series of pulleys which helps to minimize bending of the blade during the reciprocating motion.

Still yet another object of the present invention is to provide a new hacksaw with a reciprocating blade that incorporates a variable speed switch for better control of the blade.

To this end, the present invention generally comprises a U-shaped housing with a hacksaw blade. A motor assembly is positioned in the interior of the housing. A pair of cam members for converting rotational motion into linear motion is rotatably coupled to the housing. A pair of drive pulleys is coupled to the cam members, with one being coupled to the motor assembly. A plurality of idler pulleys are positioned in the interior of the housing. A drive belt links the motor assembly and a second drive pulley. A power source powers the motor assembly. An actuator selectively provides power from the power source to the motor assembly. A holding mechanism selectively holds the hacksaw blade stationary in conjunction with the motor assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

For a more complete understanding of the present invention and the advantages thereof, reference is now made to the following descriptions taken in conjunction with the accompanying drawings in which.

DESCRIPTION OF THE PREFERRED EMBODIMENT

Figure 1:
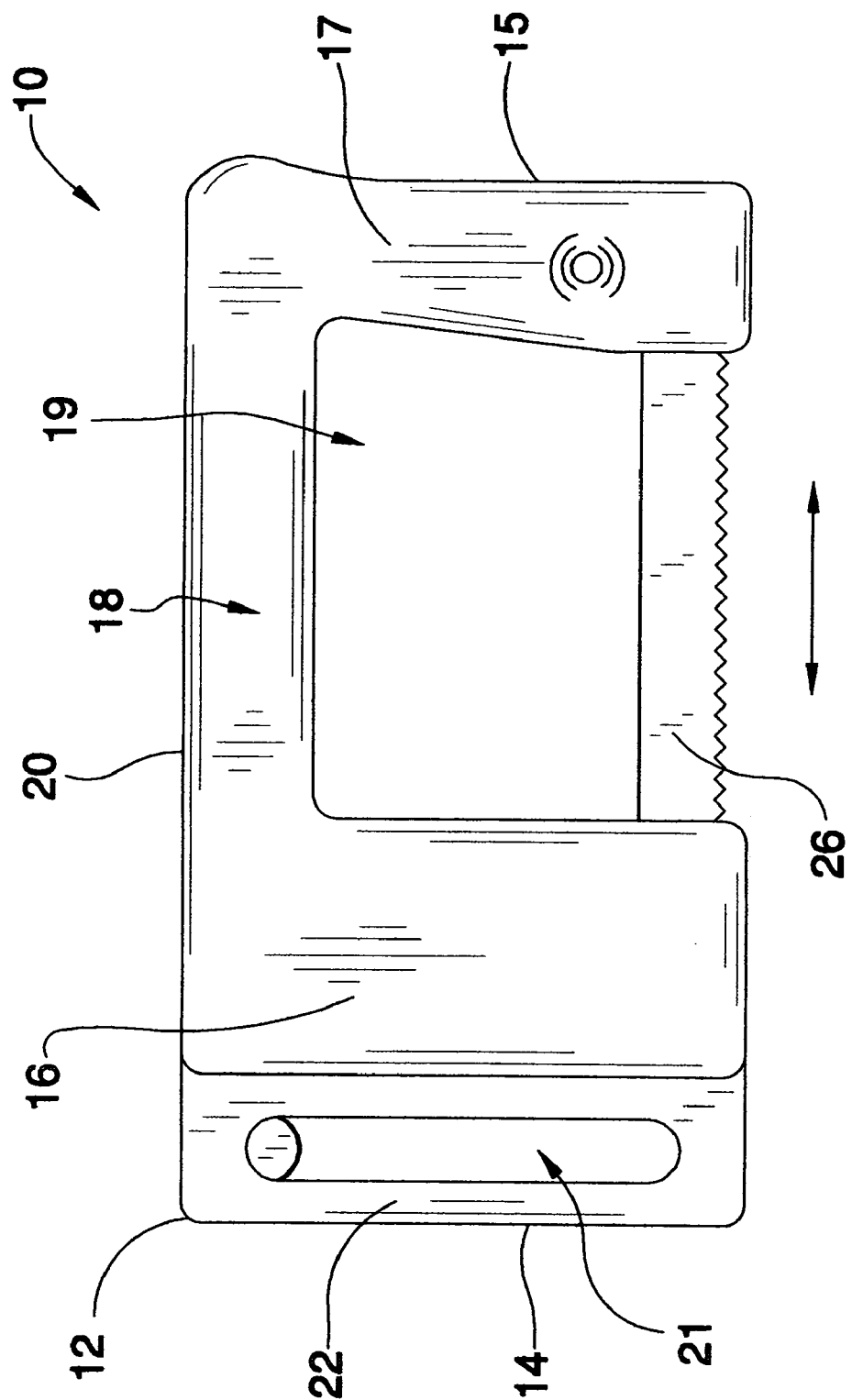
FIG. 1 is a schematic front view of a new hacksaw with a reciprocating blade according to the present invention.
Figure 2:
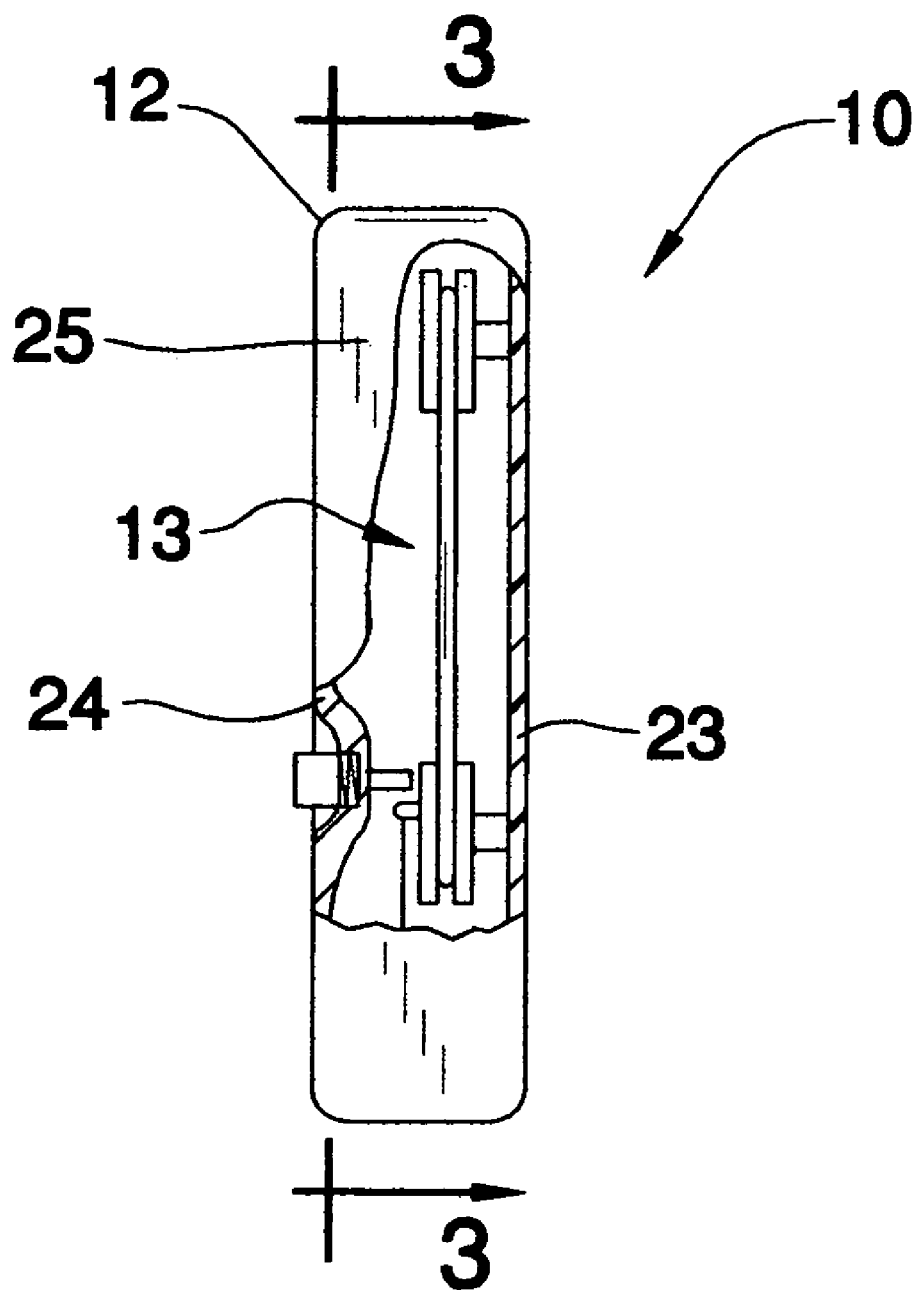
FIG. 2 is a schematic sectional end view of the present invention.
Figure 3:
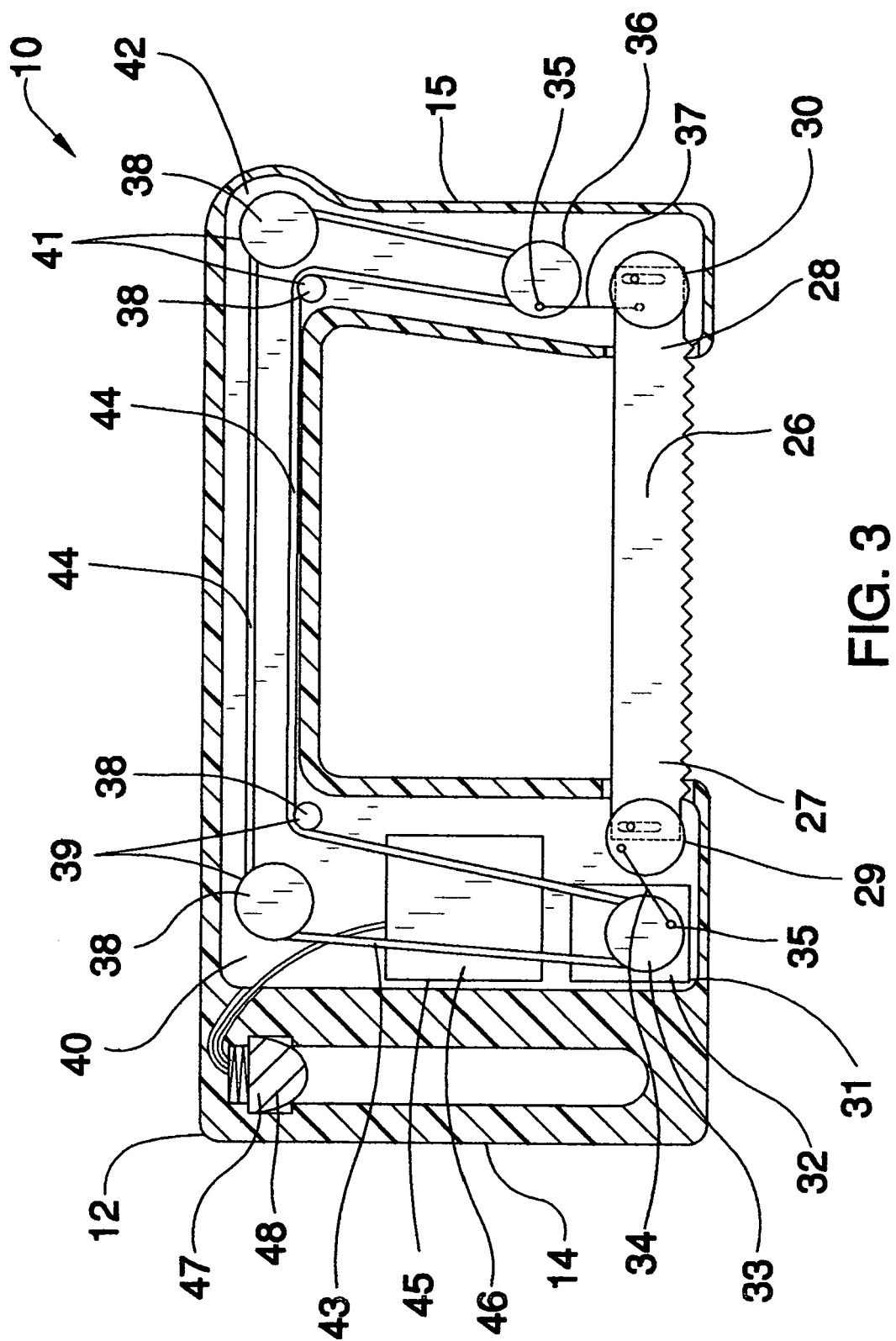
FIG. 3 is a schematic cross-sectional front view of the present invention.

With reference now to the drawings, and in particular to FIGS. 1 through 3 thereof, a new hacksaw with a reciprocating blade embodying the principles and concepts of the present invention and generally designated by the reference numeral 10 will be described.

As best illustrated in FIGS. 1 through 3, the hacksaw with a reciprocating blade 10 generally comprises a U-shaped housing 12 that has an interior 13. The housing 12 has a first end 14 and a second end 15 and comprises a first portion 16, a second portion 17, and a middle portion 18. The portions 16, 17 and 18 define a gap 19 for receiving material to be cut.

The first portion 16 is positioned adjacent to the first end 14 and the second portion 17 is positioned adjacent to the second end 15. The middle portion 18 is coupled to and extends ends of the linkage member 35 between the first portion 16 and the second portion 17. The middle portion 18 is positioned adjacent to a top side 20 of the housing 12.

The first portion 16 of the housing 12 has a slot 21 extending therethrough. The slot 21 is positioned adjacent to the first end 14 and is oriented substantially perpendicular to a longitudinal axis of the housing 12 such that the slot 21 and the first end 14 form a handle 22 for grasping onto by the user.

The housing 12 has a front wall 23, a back wall 24, and a peripheral wall 25 that is attached to and extends ends of the linkage member 35 between the front wall 23 and the back wall 24 to define the interior 13.

A hacksaw blade 26 for cutting the materials is positioned in the gap 19 and extends ends of the linkage member 35 between the first portion 16 and the second portion 17 of the housing 12. The hacksaw blade 26 is spaced from the middle portion 18 of the housing 12. The hacksaw blade 26 has an inner end 27 and an outer end 28. The inner end 27 is positioned in the interior 13 of the first portion 16, and the outer end 28 is positioned in the interior 13 of the second portion 17. The hacksaw blade 26 is oriented substantially parallel to a plane of the front wall 23 and the back wall 24 of the housing 12.

An inner cam member 29 converts rotational motion into linear motion. The inner cam member 29 is rotatably coupled to the housing 12 and is positioned in the first portion 16. The inner cam member 29 is coupled to the inner end 27 of the hacksaw blade 26 such that the hacksaw blade 26 moves in a reciprocal manner in a longitudinal direction parallel to the longitudinal axis of the housing 12 when the inner cam member 29 rotates.

An outer cam member 30 converts rotational motion into linear motion. The outer cam member 30 is rotatably coupled to the housing 12 and is positioned in the second portion 17. The outer cam member 30 is coupled to the outer end 28 of the hacksaw blade 26 such that the hacksaw blade 26 moves in a reciprocal manner along the longitudinal axis of the housing 12 when the outer cam member 30 rotates.

A motor assembly 31 is positioned in the interior 13 of the housing 12 and includes a motor 32 and a first drive pulley 33 rotatably mounted on the motor 32.

A first linkage member 34 is coupled to and extends ends of the linkage member 35 between the first drive pulley 33 and the inner cam member 29. Ends of the linkage member 35 of the first linkage member 34 are pivotally mounted on the first drive pulley 33 and the inner cam member 29 such that rotation of the first drive pulley 33 causes the inner cam member 29 to rotate.

A second drive pulley 36 is positioned in the interior 13 of housing 12.

A second linkage member 37 is coupled to and extends ends of the linkage member 35 between the second drive pulley 36 and the outer cam member 30. Ends 35 of the second linkage member 37 are pivotally mounted on the second drive pulley 36 and the outer cam member 30 such that rotation of the second drive pulley 36 causes the outer cam member 30 to rotate.

A plurality of idler pulleys 38 are positioned in the interior 13 of the housing 12. A first pair 39 of the idler pulleys 38 is located in an upper section of the first portion 40 of the housing 12. A second pair 41 of idler pulleys 38 is located in an upper section of the second portion 41 of the housing 12.

A drive belt 43 is wrapped about the first drive pulley 33 and the second drive pulley 36. A middle section 44 of the drive belt 43 engages each of the idler pulleys 38. Rotation of the first drive pulley 33 causes rotation of the second drive pulley 36 such that the hacksaw blade 26 moves in a reciprocating manner upon activation of the motor 32.

A power source 45 powers the motor 32. The power source 45 is positioned in the interior 13 of the housing 12, and is electrically coupled to the motor 32. The power source 45 comprises a battery 46.

An actuator 47 selectively provides power from the power source 45 to the motor 32. The actuator 47 is positioned on the housing 12 adjacent to the slot 21 and is electrically coupled to the power source 45 and the motor 32. The actuator 47 comprises a variable position switch 48.

A holding mechanism for selectively holding the hacksaw blade 26 stationary is attached to and extends ends of the linkage member 35 into the housing 12. The holding mechanism is selectively positionable such that the user may move the holding mechanism inward into the housing 12 until the mechanism abuts the inner cam member 29 such that movement of the hacksaw blade 26 is further restricted in conjunction with resistance from the motor assembly 31.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in art, it is not desired to limit the invention to the exact construction and operation shown and described, and accordingly, all suitable modifications and equivalents may be resorted to, falling within the scope of the invention.

I claim:

1. A hacksaw with a reciprocating blade for minimizing the amount of manual action needed to operate said hacksaw, said hacksaw comprising:
    a U-shaped housing having an interior, said housing having a first end and a second end, said housing comprising a first portion, a second portion, and a middle portion, said first, second, and middle portions defining a gap for receiving material to be cut;
    a hacksaw blade for cutting the materials positioned in said gap;
    an inner cam member for converting rotational motion into linear motion, said inner cam member being rotatably coupled to said housing and positioned in said first portion;
    an outer cam member for converting rotational motion into linear motion, said outer cam member being rotatably coupled to said housing and positioned in said second portion;
    a motor assembly being positioned in said interior of said housing;
    a first linkage member being rotatably coupled to and extending between said motor assembly and said inner cam member;
    a second linkage member being rotatably coupled to and extending between a second drive pulley and said outer cam member;
    a plurality of idler pulleys being positioned in said interior of said housing;
    a continuous loop drive belt for linking said motor assembly and said second drive pulley;
    a power source for powering said motor assembly;
    an actuator for selectively providing power from said power source to said motor assembly; and
    a holding mechanism for selectively holding said hacksaw blade stationary.

2. The electrically driven hacksaw as set forth in claim 1, wherein said first portion is positioned adjacent to said first end and second portion is positioned adjacent to said second end, said middle portion being coupled to and extending between said portion and said second portion, said middle portion being positioned adjacent to a top side of said housing.

3. The electrically driven hacksaw as set forth in claim 1, further comprising said first portion of said housing having a slot extending therethrough, said slot being positioned adjacent to said first end and being oriented substantially perpendicular to a longitudinal axis of said housing such that said slot forms a handle for grasping onto by the user.

4. The electrically driven hacksaw as set forth in claim 1, further comprising said housing having a front wall, a back wall, and a peripheral wall attached to and extending between said front wall and said back wall to define said interior.

5. The electrically driven hacksaw as set forth in claim 1, further comprising said hacksaw blade extending between said first portion and said second portion of said housing, said hacksaw blade being spaced from said middle portion of said housing.

6. The electrically driven hacksaw as set forth in claim 4, further comprising said hacksaw blade having an inner end and an outer end, said inner end being positioned in said interior of said first portion, said outer end being positioned in said interior of said second portion, said hacksaw blade being oriented substantially parallel to a plane of said front wall and said back wall of said housing.

7. The electrically driven hacksaw as set forth in claim 6, further comprising said inner cam member being coupled to said inner end of said hacksaw blade such that said hacksaw blade moves in a reciprocal manner in a longitudinal direction parallel to said longitudinal axis of said housing when said inner cam member rotates.

8. The electrically driven hacksaw as set forth in claim 6, further comprising said outer cam member being coupled to said outer end of said hacksaw blade such that said hacksaw blade moves in a reciprocal manner along a longitudinal axis of said housing when said outer cam member rotates.

9. The electrically driven hacksaw as set forth in claim 1, further comprising said motor assembly including a motor and a first drive pulley rotatably mounted on said motor for rotating said first drive pulley.

10. The electrically driven hacksaw as set forth in claim 9, further comprising ends of said first linkage member being pivotally mounted on said first drive pulley and said inner cam member such that rotation of said first drive pulley causes said inner cam member to rotate.

11. The electrically driven hacksaw as set forth in claim 1, further comprising ends of said second linkage member being pivotally mounted on said second drive pulley and said outer cam member such that rotation of said second drive pulley causes said outer cam member to rotate.

12. The electrically driven hacksaw as set forth in claim 1, further comprising a first pair of said idler pulleys being located in an upper section of said first portion of said housing, a second pair of idler pulleys being located in an upper section of said second portion of said housing.

13. The electrically driven hacksaw as set forth in claim 9, further comprising said continuous loop drive belt being wrapped about said first drive pulley and said second drive pulley, a middle section of said continuous loop drive belt engaging each of said idler pulleys, wherein rotation of said first drive pulley causes rotation of said second drive pulley such that said hacksaw blade moves in a reciprocating manner upon activation of said motor assembly.

14. The electrically driven hacksaw as set forth in claim 9, further comprising said power source being positioned in said interior of said housing, said power source being electrically coupled to said motor, said power source comprising a battery.

15. The electrically driven hacksaw as set forth in claim 3, further comprising said actuator being positioned on said housing adjacent to said slot, said actuator being electrically coupled to said power source and said motor assembly, said actuator comprising a variable position switch.

16. The electrically driven hacksaw as set forth in claim 1, further comprising said holding mechanism being attached to and extending into said housing, said holding mechanism being selectively positionable such that the user may move said holding mechanism inward into said housing until said mechanism abuts said inner cam member such that movement of said hacksaw blade is further restricted in conjunction with resistance from said motor assembly.

17. A hacksaw with a reciprocating blade for minimizing the amount of manual action needed to operate said hacksaw, said hacksaw comprising:

a U-shaped housing having an interior, said housing having a first end and a second end, said housing comprising a first portion, a second portion, and a middle portion, said first, second, and middle portions defining a gap for receiving material to be cut, wherein said first portion is positioned adjacent to said first end and said second portion is positioned adjacent to said second end, said middle portion being coupled to and extending between said first portion and said second portion, said middle portion being positioned adjacent to a top side of said housing, said first portion of said housing having a slot extending therethrough, said slot being positioned adjacent to said first end and being oriented substantially perpendicular to a longitudinal axis of said housing such that said slot forms a handle for grasping onto by the user, said housing having a front wall, a back wall, and a peripheral wall attached to and extending between said front wall and said back wall to define said interior;

a hacksaw blade for cutting the materials positioned in said gap, said hacksaw blade extending between said first portion and said second portion of said housing, said hacksaw blade being spaced from said middle portion of said housing, said hacksaw blade having an inner end and an outer end, said inner end being positioned in said interior of said first portion, said outer end being positioned in said interior of said second portion, said hacksaw blade being oriented substantially parallel to a plane of said front wall and said back wall of said housing;

an inner cam member for converting rotational motion into linear motion, said inner cam member being rotatably coupled to said housing and positioned in said first portion, said inner cam member being coupled to said inner end of said hacksaw blade such that said hacksaw blade moves in a reciprocal manner in a longitudinal direction parallel to said longitudinal axis of said housing when said inner cam member rotates;

an outer cam member for converting rotational motion into linear motion, said outer cam member being rotatably coupled to said housing and positioned in said second portion, said outer cam member being coupled to said outer end of said hacksaw blade such that said hacksaw blade moves in a reciprocal manner along said longitudinal axis of said housing when said outer cam member rotates;

a motor assembly being positioned in said interior of said housing, said motor assembly including a motor and a first drive pulley mounted on said motor for rotating said first drive pulley;

a first linkage member being coupled to and extending between said first drive pulley and said inner cam member, ends of said first linkage member being pivotally mounted on said first drive pulley and said inner cam member such that rotation of said first drive pulley causes said inner cam member to rotate;

a second drive pulley being positioned in said interior of housing;

a second linkage member being coupled to and extending between said second drive pulley and said outer cam member, ends of said second linkage member being pivotally mounted on said second drive pulley and said outer cam member such that rotation of said second drive pulley causes said outer cam member to rotate;

a plurality of idler pulleys being positioned in said interior of said housing, a first pair of said idler pulleys being located in an upper section of said first portion of said housing, a second pair of idler pulleys being located in an upper section of said second portion of said housing;

a continuous loop drive belt for linking said first drive pulley and said second drive pulley, said continuous loop drive belt being wrapped about said first drive pulley and said second drive pulley, a middle section of said continuous loop drive belt engaging each of said idler pulleys, wherein rotation of said first drive pulley causes rotation of said second drive pulley such that said hacksaw blade moves in a reciprocating manner upon activation of said motor;

a power source for powering said motor, said power source being positioned in said interior of said housing, said power source being electrically coupled to said motor, said power source comprising a battery;

an actuator for selectively providing power from said power source to said motor, said actuator being positioned on said housing adjacent to said slot, said actuator being electrically coupled to said power source and said motor, said actuator comprising a variable position switch; and a holding mechanism for selectively holding said hacksaw blade stationary, said holding mechanism being attached to and extending into said housing, said holding mechanism being selectively positionable such that the user may move said holding mechanism inward into said housing until said mechanism abuts said inner cam member such that movement of said hacksaw blade is further restricted in conjunction with resistance from said motor assembly.

* * * * *